Sept. 26, 1950   R. H. McGIBBON ET AL   2,523,772
ELECTROMAGNETICALLY OPERATED COIL CLUTCH
Filed Sept. 22, 1948   2 Sheets-Sheet 1

Inventors:
Thomas S. Skillman
Lloyd J. Owen
Reginald H. McGibbon
by Ward, Curly & Neal
Attorneys Sept. 26, 1950  R. H. McGIBBON ET AL  2,523,772
ELECTROMAGNETICALLY OPERATED COIL CLUTCH
Filed Sept. 22, 1948  2 Sheets-Sheet 2

Inventors:
Thomas S. Skillman.
Lloyd J. Owen.
Reginald H. McGibbon.
by Ward, Cady & Henf
Attorneys Patented Sept. 26, 1950

2,523,772

UNITED STATES PATENT OFFICE 2,523,772

ELECTROMAGNETICALLY OPERATED COIL CLUTCH

Reginald Henry McGibbon, Kirribilli, near Sydney, Thomas Samuel Skillman, Mosman, near Sydney, and Lloyd Jones Owen, Epping, near Sydney, New South Wales, Australia, assignors to Communication Engineering Pty. Limited, Sydney, New South Wales, Australia, a company incorporated in the State of the Australian Capital Territory, Australia Application September 22, 1948, Serial No. 50,504
In Australia October 8, 1947

7 Claims. (Cl. 192—40)

The invention relates to clutch arrangements and more particularly to clutches which are to be compact, and which are to control comparatively heavy loads travelling at comparatively slow speed.

Such clutch arrangements are for example necessary for article dispensing systems to drive the movable members on or in which articles are stored to be selectively discharged therefrom.

It has been proposed for this purpose to use clutches in which the driving member carries a spiral spring which wraps around a cylindrical part of the driven member during engagement and which is free of said cylindrical part when the clutch is disengaged. This clutch is operated by an additional friction clutch which, when operated, engages a disc connected with the trailing end of said spiral spring thus tightening said spring around the cylindrical part of the driven member. Clutches of the type described above have, however, the disadvantage that the mechanism operating the friction clutch constitutes a permanent load on the driving member owing to the friction between the stationary and rotating parts. Furthermore the disc connected with the trailing end of the spiral spring and driven thereby, is supported on the driven member and any friction occurring between the disc and the driven member causes false operation of the clutch.

These difficulties are overcome according to the invention by a clutch arrangement having a driving and a driven member and two or more symmetrically arranged spiral springs rotating with said driving member, which in the disengaged position encircle without contact a cylindrical part of the driven member. The spiral springs support an actuating member in a centred position in relation to the axis of rotation of the driven member. An electro-magnet forms part of said driven member and is arranged opposite the actuating member to attract and thus retard this rotating actuating member when the clutch is to be engaged. By retarding this actuating member the spiral springs are wrapped around and thus engage the cylindrical part of the driven member.

According to another feature of the invention one end of each of the spiral springs is secured to a boss rotating with the driving member and the trailing ends of said springs are fixed to the actuating member at points symmetrically spaced around its centre of rotation.

According to still another feature of the invention the spiral springs are screwed onto a boss with a tapered thread thus centring the springs with regard to the axis of rotation of the driving member.

It is still a further feature of the invention to allow a limited longitudinal movement of the driven member with respect to the driving member along the axis of rotation and to define the limits for this movement in relation to the expansion of the spiral springs when they wrap around the cylindrical part of the driven member.

These and further features of the invention will be more clearly seen from the following description of one example form of the invention in conjunction with the drawings, in which.

Figure 1:
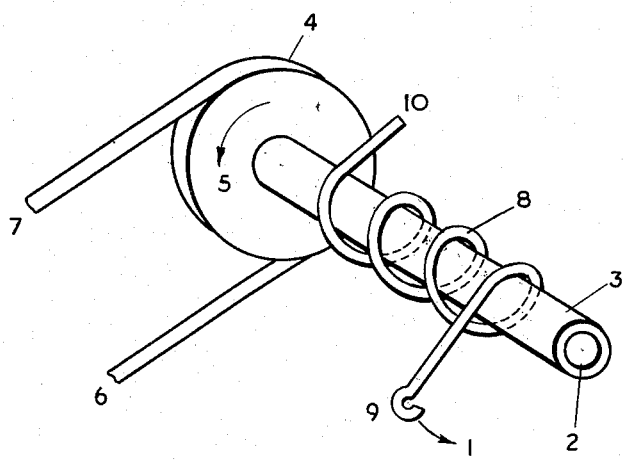
Fig. 1 is a schematic perspective view illustrating the principle of engagement of the clutch.

Referring to Fig. 1 a driving member rotates in the direction shown by the arrow 1 about a shaft passing through the hole 2 in the cylindrical surface 3, the cylindrical surface 3 being portion of the driven member 4 which when moving rotates in the direction shown by the arrow 5. The driven member 4 operates a load represented by the belt 6—7. When the clutch is in the disengaged condition the driven member 4 is stationary.

Attached to the driving member (not shown) is a spiral spring 8 having a leading end 9, attached to said driving member, and a trailing end 10. In the disengaged condition when the trailing end 10 of the spring is entirely free and unconstrained the diameter of the spring 8 is such that the spring rotates freely around the cylindrical surface 3 when it is carried around by the driving member.

When the clutch is to be engaged, the trailing end 10 of the spring 8 is retarded, consequently causing the spring to wrap around the cylindrical surface 3 and when sufficient force is exerted on the trailing end 10, contact without motion is established between the spiral spring 8 and the cylindrical surface 3 causing the driven member 4 to rotate in the direction shown by the arrow 5.

Figure 2:
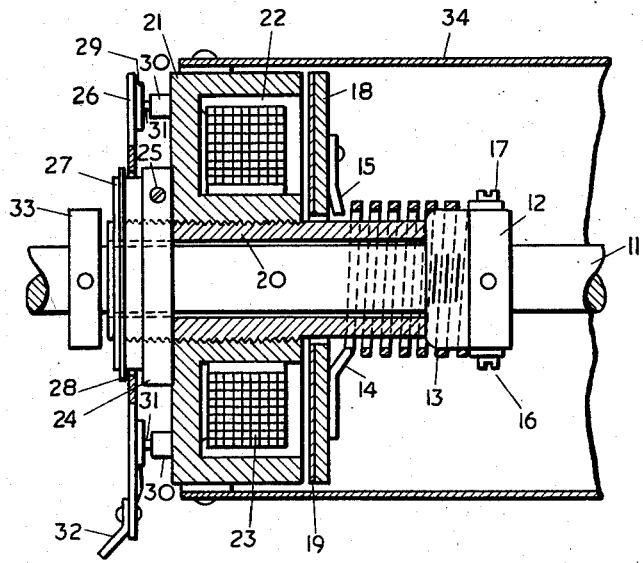
Fig. 2 is a view in axial section showing one form of the clutch.

An improved clutch arrangement is shown in detail in Fig. 2. The driving member consists of a shaft 11 which is driven by a suitable driving force (not shown). A boss 12 is secured to shaft 11. Boss 12 is tapered on one side and has a thread 13 which carries two spiral springs 14 and 15 wound together and secured to boss 12 by screws 16 and 17 respectively. The tapered thread on boss 12 holds the two springs 14 and 15 in a fixed centered position with regard to the axis of rotation of the shaft 11 and furthermore takes the strain off the screws 16 and 17.

The other ends of the spiral springs 14 and 15 are fixed at diametrically opposed points on one side of a disc-shaped armature 18 of magnetic material, thus centering this armature 18 always in relation to the axis of rotation of shaft 11. The other side of armature 18 may be covered with a thin plate 19 of brass or other non-magnetic material.

The driven member consists of a sleeve 20 which is slidably and rotatably mounted on shaft 11 and is partly threaded to carry a pot-shaped core 21 of magnetic material having a circular groove 22 to take a cylindrical coil 23. The core 21 is held in position on the sleeve 20 by locking means, for example a nut 24 screwed on to said sleeve. Said nut is preferably slotted and clamped on to sleeve 20 by a screw 25.

A plate 26 of insulating material is freely rotatable mounted on sleeve 27 forming part of nut 25 and held in position by a spring ring 28 fixed to this sleeve. Plate 26 carries a metal slip ring 29, which is concentrical to shaft 11.

The core 21 carries two brush holders 30 in opposite positions, which are electrically connected in parallel with one end of the coil 23, while the other end of the coil is electrically connected with the core 21 and thus with shaft 11. Brushes 31 in said brushholders 30 make contact with the slip ring 29 and this slip ring is electrically connected via a soldering lug 32, a screw or the like, with an electrical circuit (not shown) to operate the clutch.

A collar 33 is fixed on shaft 11 in such a position as to allow a limited movement of sleeve 20 in the longitudinal direction. When the clutch starts to operate and the springs 14 and 15 start to wrap around sleeve 20 as described later on, the springs expand in length and thus shift armature 18 and core 21 with sleeve 20 on shaft 11 in the direction of the axis of rotation. The clearance between sleeve 20 and boss 12 and collar 33 respectively must be sufficient to allow this movement of sleeve 20 and thus to avoid jamming of sleeve 20 against collar 33 when armature 18 is held against core 21 in the operated position.

The core 21 carries a drum or roller 34 which provides a surface for driving a load such as the belt 6—7 in Fig. 1. It must be understood that any other structure can be connected with and operated by core 21.

When the clutch is disengaged shaft 11 with boss 12, carrying the springs 14 and 15 and the armature 18 are rotating continuously, while sleeve 20 with core 21, nut 24 and drum 34 remain stationary, the springs 14 and 15 being held completely clear from the sleeve 20 by the centering action of boss 12.

To operate the clutch an electrical current is passed through the coil 23 via the soldering lug 32, the slip ring 29, the brushes 31 and brushholders 30, the coil 23 and back through sleeve 20 and shaft 11. Core 21 is magnetised and attracts armature 18. The friction between core 21 and armature 18 causes the ends of springs 14 and 15 fixed to armature 18 to be retarded so that the springs wrap around the sleeve 20 thereby causing this sleeve to rotate together with shaft 11.

When the magnetic circuit is sufficiently energized, the armature 18 is held with sufficient force against the core 21 to prevent movement. It is well known that the force which must be exerted on the ends of springs 14 and 15 is very much less than the force which is exerted by the leading ends secured to boss 12, the ratio of these forces depending on the number of turns of the springs 14 and 15. Thus a comparatively small electromagnet is by the arrangement of the clutch able to control the transmission of large amounts of power or large forces; for example with several turns of the springs an electromagnet applying a turning moment of one foot-pound to the armature 18 against the core 21 is able to cause the whole clutch to transmit, say one hundred foot-pounds torque from the shaft 11 to the drum 34.

When the electric current through coil 23 is interrupted the clutch disengages quickly as the armature 18 is released by core 21, and the plate 19 of non-magnetic material between armature and core avoids sticking of the armature through remanent magnetism. The springs 14 and 15 are now free to return to their initial position, in which they are kept free from sleeve 20 by their fastening on the tapered end of boss 12.

Figure 3:
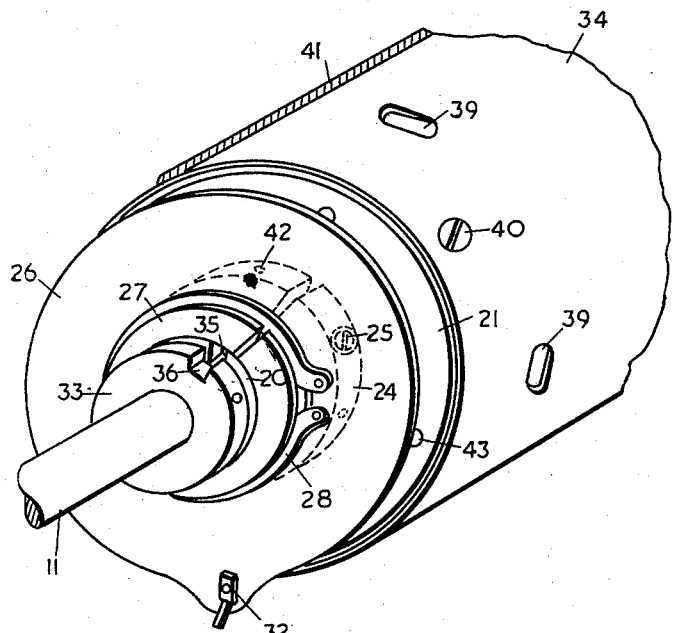
Fig. 3 shows further details of the clutch in a perspective view.
Figure 4:
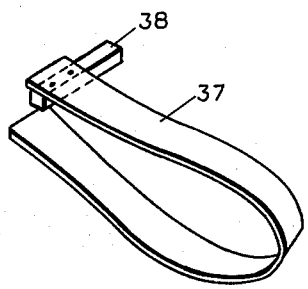
Fig. 4 is a perspective view of an adjustment tool, which can be used in adjusting the clutch.

Details of the clutch with facilities for the measuring and adjusting of the air-gap between the electromagnet and the armature are shown in Figs. 3 and 4. All parts corresponding to parts shown in Fig. 2 are marked with the same reference figures.

When the clutch is assembled the air-gap between the core 21 of the magnet and the armature can be checked through holes 39, which are arranged around the circumference of drum 34, for example 120° from each other. These holes enable an inspection of the air-gap without completely removing the drum 34 from core 21, and thus allow a plurality of clutches to be mounted near to each other on the same driving shaft. If it is desirable to avoid dust passing through the holes 39 into the air-gap, these holes can be so arranged that they are normally closed by core 21. In this case the drum 34 is detached from core 21 by removing the screws 40 and then shifted slightly in a longitudinal direction to expose the air-gap through the holes 39.

To adjust the air-gap the following procedure is used:

The sleeve 20 is held in a fixed position by coupling it with the driving shaft 11 using an adjustment tool (Fig. 4) which consists of a U-shaped spring 37 and a key 38 fixed to one end of spring 37. The key 38 fits into notch 36 (Fig. 3) of collar 33 and notch 35 at the end of sleeve 20. When the adjustment tool is pushed over the collar 33 the key 38 thus connects shaft 11 via the collar 33 with the sleeve 20.

The slotted nut 24 is loosened by unscrewing screw 25 and the nut is then slightly screwed away from core 21 by inserting a pin in one of the holes 42 in the circumference of said nut.

By inserting a pronged tool of suitable shape into the holes 43 at the side of core 21 this core can be screwed forward or backward on sleeve 21 until the air-gap is properly adjusted, which can be checked, as mentioned before, through the holes 39 in drum 34. The nut 24 is then screwed against core 21 and tightened by screw 25 to fix core 21 in the right position. If necessary the drum 34 can be covered by a layer 41 of rubber or other suitable material to provide a better grip on a belt driven by drum 34. In this case the layer is provided with holes corresponding to the holes 39 in drum 34 and with additional slots to give access to the screws 40.

The foregoing description shows the invention by way of example only and the functions can be reversed so that the driven member becomes the driving member and vice versa. Further modifications in the structure of the clutch arrangement can be made without departing from the scope of the invention.

We claim:

1. Clutch arrangement comprising a driving member and a driven member, a plurality of symmetrically arranged spiral springs each secured at one end to a boss rotating with said driving member, said springs tightly encircling said boss for part of their length and in the disengaged position encircling without contact a cylindrical part of said driven member for another part of their length, an actuating member supported by said springs in a centred position in relation to the axis of rotation of said driven member, the free ends of said springs being fixed to said actuating member at points symmetrically spaced around its centre of rotation, and an electromagnet forming part of said driven member and arranged opposite said actuating member to attract and thus retard said rotating actuating member, when said clutch is to be engaged, said retarded actuating member then tightening said springs around said cylindrical part of said driven member and said boss.

2. Clutch arrangement comprising a driving member and a driven member, a plurality of spiral springs wound together and screwed tightly onto a boss rotating with said driving member and having a tapered thread to receive said springs and centre them with regard to the axis of rotation of said driving member, said springs in the disengaged position encircling without contact a cylindrical part of said driven member for part of their length, an actuating member supported by said springs in a centred position in relation to the axis of rotation of said driven member, the free ends of said springs being fixed to said actuating member at points symmetrically spaced around its centre of rotation, and an electromagnet forming part of said driven member and arranged opposite said actuating member to attract and thus retard said rotating actuating member, when said clutch is to be engaged, said retarded actuating member then tightening said springs around said cylindrical part of said driven member and said boss.

3. Clutch arrangement comprising a driving member and a driven member, said driven member being rotatably and slidably mounted on said driving member, a plurality of symetrically arranged spiral springs rotating with said driving member and in the disengaged position encircling without contact a cylindrical part of said driven member, an actuating member supported by said springs in a centred position in relation to the axis of rotation of said driven member, an electromagnet forming part of said driven member and arranged opposite said actuating member to attract and thus retard said rotating actuating member, when said clutch is to be engaged, said retarded actuating member then wrapping said springs around and engaging said cylindrical part of said driven member, and means to limit the longitudinal sliding movement of said driven member to the amount of expansion of said spiral springs when in the engaged position they wrap around said cylindrical part of said driven member.

4. Clutch arrangement comprising a shaft, a sleeve supported by and freely rotatably and slidably mounted on said shaft, an electromagnet secured on said sleeve, a boss secured to said shaft, two spiral springs fixed to said boss and in the disengaged position encircling without contact part of said sleeve, an armature supported by said springs opposite said electromagnet in a centred position in relation to the axis of rotation of said shaft, a drum fixed to said electromagnet and enclosing said electromagnet and said springs with said armature, a contact disc freely rotatable on said sleeve and in contact with two contact brushes fixed to and electrically connected with said electromagnet and a collar so adjusted on said shaft and fixed thereon as to limit the longitudinal sliding movement of said sleeve on said shaft to the amount of expansion of the spiral springs in the engaged position.

5. Clutch arrangement as claimed in claim 4 and in which said electromagnet is screwed on to said sleeve and is secured against movement on said sleeve by locking means, said electromagnet and said locking means being adjusted on said sleeve in predetermined relation to said armature.

6. Clutch arrangment as claimed in claim 4 and in which said drum is covered by a layer of rubber.

7. Clutch arrangement comprising a driving shaft, a sleeve supported by and freely rotatable on said driving shaft, an electromagnet screwed on to and secured on said sleeve by a slotted nut, a boss secured to said driving shaft and carrying two spiral springs, said springs in the disengaged position encircling without contact part of said sleeve, an armature supported by said springs opposite said electromagnet, a drum fixed to said electromagnet and enclosing said electromagnet and said springs with said armature and a collar on said driving shaft to limit the longitudinal sliding movement of said sleeve on said driving shaft, said collar and the end of said sleeve opposite said collar having notches adjacent to each other adapted for the insertion of an adjustment tool to provide a coupling between said driving shaft and said sleeve.

REGINALD HENRY McGIBBON.
THOMAS SAMUEL SKILLMAN.
LLOYD JONES OWEN.

REFERENCES CITED

The following references are of record in the file of this patent:

UNITED STATES PATENTS

| Number | Name | Date |
|---|---|---|
| 875,757 | Watson | Jan. 7, 1908 |
| 1,760,223 | Wittkuhns | May 27, 1930 |
| 2,374,688 | La Brie | May 1, 1945 |

FOREIGN PATENTS

| Number | Country | Date |
|---|---|---|
| 324,694 | Germany | Jan. 25, 1914 |
| 342,887 | France | May 5, 1904 |
| 539,361 | Great Britain | Sept. 8, 1941 |